(12) United States Patent
Masuda et al.

(10) Patent No.: US 11,874,159 B2
(45) Date of Patent: Jan. 16, 2024

(54) ULTRASONIC SENSOR

(71) Applicant: Panasonic Intellectual Property Management Co., Ltd., Osaka (JP)

(72) Inventors: Tomoki Masuda, Osaka (JP); Yudai Ishizaki, Kyoto (JP); Hidetomo Nagahara, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 42 days.

(21) Appl. No.: 17/616,985

(22) PCT Filed: Jul. 21, 2020

(86) PCT No.: PCT/JP2020/028212
§ 371 (c)(1),
(2) Date: Dec. 6, 2021

(87) PCT Pub. No.: WO2021/024790
PCT Pub. Date: Feb. 11, 2021

(65) Prior Publication Data
US 2022/0163378 A1 May 26, 2022

(30) Foreign Application Priority Data
Aug. 8, 2019 (JP) .................... 2019-145885

(51) Int. Cl.
*G01H 11/08* (2006.01)
*H04R 17/00* (2006.01)

(52) U.S. Cl.
CPC ............. *G01H 11/08* (2013.01); *H04R 17/00* (2013.01)

(58) Field of Classification Search
CPC ................................. G01H 11/08; H04R 17/00
See application file for complete search history.

(56) References Cited

U.S. PATENT DOCUMENTS

| 6,545,947 B1 * | 4/2003 | Morozumi ............. G10K 11/02 367/140 |
| 2004/0113522 A1 | 6/2004 | Nagahara et al. |

(Continued)

FOREIGN PATENT DOCUMENTS

| JP | 2004-184423 | 7/2004 |
| JP | 2009-5383 | 1/2009 |

(Continued)

OTHER PUBLICATIONS

International Search Report of PCT application No. PCT/JP2020/028212 dated Oct. 13, 2020.

(Continued)

*Primary Examiner* — Peter J Macchiarolo
*Assistant Examiner* — John M Royston
(74) *Attorney, Agent, or Firm* — Wenderoth, Lind & Ponack, L.L.P.

(57) ABSTRACT

Ultrasonic sensor (1) includes piezoelectric element (7), first acoustic matching layer (2), and second acoustic matching layer (5) which are laminated and bonded together, piezoelectric element (7) having a rectangular bonding surface. First acoustic matching layer (2), which is adjacent to piezoelectric element (7), is bonded to piezoelectric element (7) using thermoplastic resin injected from a thickness direction of first acoustic matching layer (2) in a manner that a flow direction of the thermoplastic resin matches a longitudinal direction of piezoelectric element (7). With this configuration, ultrasonic sensor (1) that exhibits excellent temperature characteristics against such as thermal shock is provided.

5 Claims, 2 Drawing Sheets

(56) References Cited

U.S. PATENT DOCUMENTS

| | | |
|---|---|---|
| 2005/0139013 A1 | 6/2005 | Hashimoto et al. |
| 2014/0086017 A1 | 3/2014 | Nakano et al. |
| 2019/0025102 A1 | 1/2019 | Sugaya et al. |

FOREIGN PATENT DOCUMENTS

| | | |
|---|---|---|
| JP | 2018-061209 | 4/2018 |
| JP | 2018-61209 | 4/2018 |
| WO | 2004/098234 | 11/2004 |
| WO | 2012/164890 | 12/2012 |

OTHER PUBLICATIONS

Extended European Search Report dated Aug. 2, 2022 in corresponding European Patent Application No. 20850255.9.

\* cited by examiner

ULTRASONIC SENSOR

TECHNICAL FIELD

The present disclosure mainly relates to an ultrasonic sensor that transmits and receives ultrasonic waves.

BACKGROUND ART

If the difference in acoustic impedance (the product of the density of each substance and the speed of sound) between different substances is small, the ultrasonic waves propagates through an interface between the two substances, but if the difference in acoustic impedance is large, a ratio of the ultrasonic waves being reflected at the interface becomes higher than that of propagating. Therefore, as the difference in acoustic impedance decreases, energy is propagated with higher efficiency.

However, piezoelectric elements used for ultrasonic sensors are generally made of ceramics (having a high density and a high acoustic velocity), and the density and the speed of sound in gas such as air in which the ultrasonic waves propagate are significantly smaller than those of ceramics. Therefore, the energy propagation efficiency from the piezoelectric element to the gas is significantly low.

In order to solve this problem, measures have been taken to increase the energy propagation efficiency by interposing, between the piezoelectric element and the gas, an acoustic matching layer having a smaller acoustic impedance than the piezoelectric element and a larger acoustic impedance than the gas.

From a viewpoint of the acoustic impedance, the ultrasonic waves most efficiently propagate from the piezoelectric element to the gas through the acoustic matching layer, when $$Z2^2 = Z1 \times Z3 \tag{1}$$

is satisfied.

Here, Z1 is an acoustic impedance of the piezoelectric element, Z2 is an acoustic impedance of the acoustic matching layer, and Z3 is an acoustic impedance of the gas in which the ultrasonic waves propagate.

Furthermore, in order to make the ultrasonic waves generated by the piezoelectric element propagate through the gas with high efficiency, an energy loss of the ultrasonic waves propagating through the acoustic matching layer needs to be suppressed low. A factor of the energy loss of the ultrasonic wave propagating inside the acoustic matching layer is that the acoustic matching layer is plastically deformed and the energy is dissipated as heat. Therefore, the substance used for the acoustic matching layer is required to be highly elastic.

However, as can be seen from the formula (1), the acoustic impedance Z2 of the acoustic matching layer needs to reduce the acoustic impedance such that the acoustic impedance is brought close to the acoustic impedance Z3 of the gas. Substances exhibiting a low acoustic impedance mean that the speed of sound is low or the density is low, and in general, many such substances are easily deformed and are not suitable for the acoustic matching layer. Specifically, the acoustic impedance of the solid piezoelectric element differs from the acoustic impedance of the gas by about five orders of magnitude, and in order to satisfy the formula (1), the acoustic impedance of the acoustic matching layer needs to be lowered to about three orders of magnitude of the acoustic impedance of the piezoelectric element.

Therefore, studies have been made to make the ultrasonic waves propagate with high efficiency by using two acoustic matching layers. Defining an acoustic matching layer that is in contact with the gas and emits ultrasonic waves as a second acoustic matching layer, and an acoustic matching layer that is in contact with the piezoelectric element as a first acoustic matching layer, from the formula (1), the ultrasonic waves most efficiently propagate from the piezoelectric element to the gas through the acoustic matching layer, when $$Z2^2 = Z1 \times Z3, \text{ and}$$

$$Z3^2 = Z2 \times Z4$$

is satisfied.

Here, Z1 is an acoustic impedance of the piezoelectric element, Z2 is an acoustic impedance of the first acoustic matching layer, Z3 is an acoustic impedance of the second acoustic matching layer, and Z4 is an acoustic impedance of the gas.

In order to achieve the low acoustic impedance and the high propagation efficiency, the second acoustic matching layer that makes ultrasonic waves propagate to the gas is desirably made of a very lightweight and hard material, and a foamed resin having relatively high elasticity has been used (see, for example, PTL 1).

CITATION LIST

Patent Literature

PTL 1: Unexamined Japanese Patent Publication No. 2018-61209

SUMMARY OF THE INVENTION

In PTL 1, a resin material is used as a first acoustic matching layer and a foamed resin material is used as a second acoustic matching layer in order to improve characteristics of an ultrasonic sensor. Because the first acoustic matching layer is made of resin material and has a very large difference in expansion coefficient from a sensor housing made of inorganic material such as metal, peeling occurs at a bonding interface due to a temperature change, and deterioration of reliability characteristics of an ultrasonic sensor becomes a problem. As a countermeasure, the density of the first acoustic matching layer is controlled by densely filling a thermosetting material such as an epoxy resin with hollow filler such as glass balloons, and meanwhile, a ratio of resin is reduced to achieve low thermal expansion to thereby solve the bonding problem.

In this method, the epoxy resin for obtaining the first acoustic matching layer has a density of about 1 g/cm³, but a density of less than 1 g/cm³ can be obtained by dispersing a large amount of hollow filler. However, in order to further improve the sensor characteristics, in the case of requiring a density design exceeding 1 g/cm³ at the time of laminating the second acoustic matching layer on the upper part, the density becomes very difficult to be achieved.

The present disclosure provides an ultrasonic sensor that achieves both excellent sensor characteristics and durability while securing bonding properties with a first acoustic matching layer having a density exceeding 1 g/cm³.

An ultrasonic sensor of the present disclosure includes: a piezoelectric element; and a plurality of acoustic matching layers including a first acoustic matching layer laminated and bonded to the piezoelectric element, in which the first acoustic matching layer includes a thermoplastic resin, and the thermoplastic resin is injected to the first acoustic matching layer from a thickness direction of the first acoustic matching layer. With this configuration, the performance of the ultrasonic sensor can be improved.

According to the present disclosure, because the first acoustic matching layer is made of the thermoplastic resin injected from the thickness direction of the first acoustic matching layer, a coefficient of thermal expansion is reduced in a flow direction of the resin. In addition, by matching this flow direction with the longitudinal direction of the piezoelectric element and then performing bonding, stress applied to the piezoelectric element generated in a course of temperature change such as thermal shock can be reduced, and the ultrasonic sensor having excellent characteristics can be provided.

DESCRIPTION OF EMBODIMENT

Hereinafter, an exemplary embodiment of an ultrasonic sensor of the present disclosure is described in detail with reference to the drawings. Note that the present disclosure is not limited to the present exemplary embodiment described above.

Exemplary Embodiment

Figure 1:
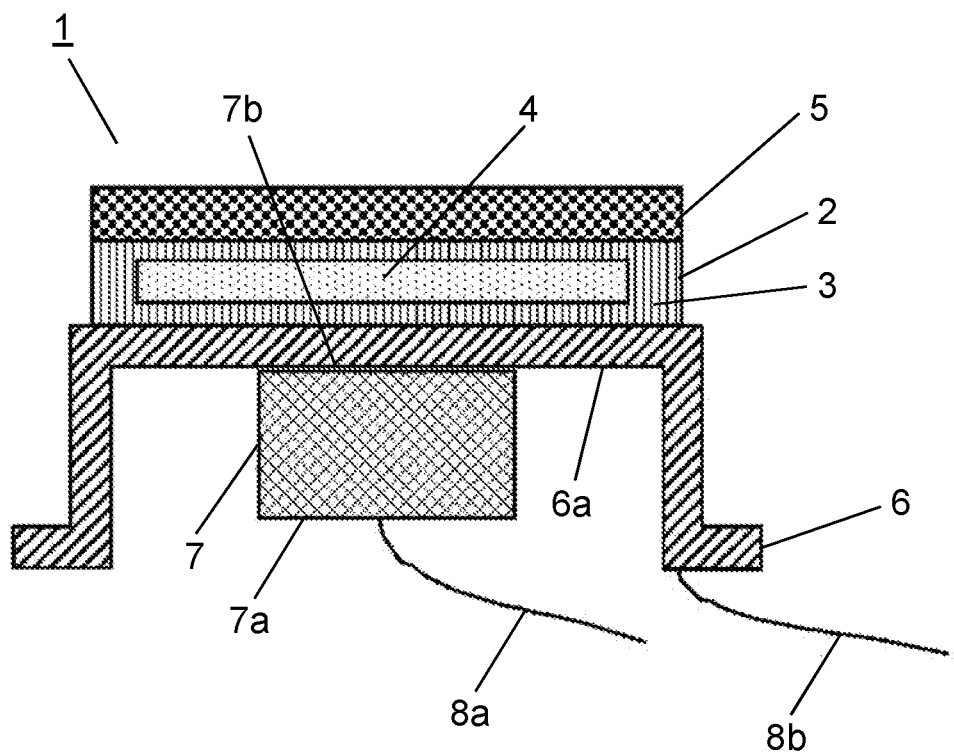
FIG. 1 is a schematic cross-sectional view of an ultrasonic sensor according to an exemplary embodiment.

FIG. 1 is a cross-sectional view of an ultrasonic sensor according to the exemplary embodiment. Ultrasonic sensor 1 includes piezoelectric element 7 and a plurality of acoustic matching layers including first acoustic matching layer 2 laminated and bonded to piezoelectric element 7. In the present exemplary embodiment, first acoustic matching layer 2, second acoustic matching layer 5, and piezoelectric element 7 are provided. Piezoelectric element 7 is made of piezoelectric ceramics and is polarized in the thickness direction. Piezoelectric element 7 is bonded to the inside of top plate 6a of metal housing 6 which is bottomed and has a tubular shape. Further, piezoelectric element 7 is a rectangular parallelepiped having a rectangular bonding surface with top plate 6a.

Among electrodes 7a and 7b constituted on both surfaces of piezoelectric element 7, one electrode 7a is drawn out by wiring line 8a connected to piezoelectric element 7, and another electrode 7b is drawn out by wiring line 8b through metal housing 6. First acoustic matching layer 2 includes skin 3 and core 4, and is bonded to the outer surface of top plate 6a of metal housing 6, and second acoustic matching layer 5 is bonded to first acoustic matching layer 2.

As a material suitable for first acoustic matching layer 2 in the present disclosure, a density of 1.0 g/cm$^3$ or more and 1.5 g/cm$^3$ or less is essential for matching acoustic impedance thereof with that of second acoustic matching layer 5 and reducing the internal loss. Furthermore, in order to reduce peeling of the bonding interface due to a difference in the coefficients of thermal expansion and the stress applied to piezoelectric element 7, the flow direction of the molded resin of first acoustic matching layer 2 needs to be in parallel in bonding with the longitudinal direction (a direction in which thermal expansion is large) of piezoelectric element 7 formed in a rectangular parallelepiped. In order to satisfy these requirements, it is required to mold first acoustic matching layer 2 from the thickness direction and to perform bonding and fixing in a manner that the flow direction of first acoustic matching layer 2 from an injection port is parallel with the longitudinal direction of piezoelectric element 7.

In the present exemplary embodiment, metal housing 6 is interposed between piezoelectric element 7 and first acoustic matching layer 2, but because the difference in the coefficients of thermal expansion between piezoelectric element 7 and metal housing 6 is substantially the same, the relationship between piezoelectric element 7 and first acoustic matching layer 2 is described including the case where metal housing 6 is not provided.

Figure 2:
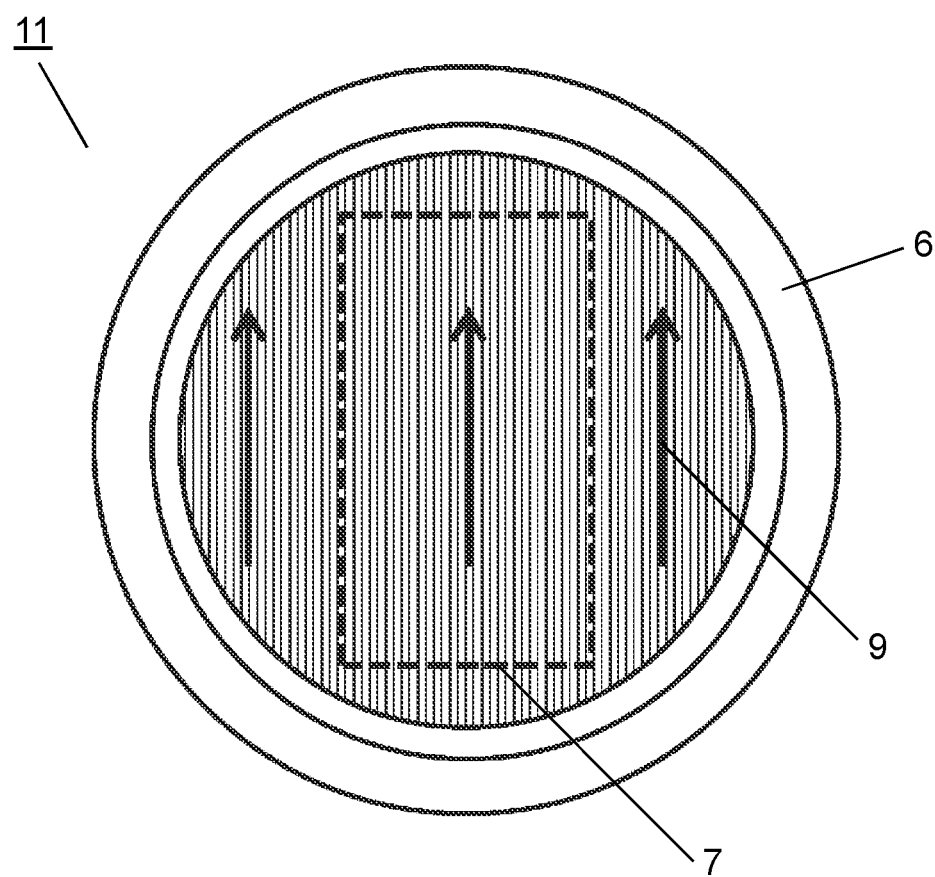
FIG. 2 is a plan view illustrating a bonding direction of a piezoelectric element and one acoustic matching layer of the ultrasonic sensor according to the exemplary embodiment.

FIG. 2 is a plan view illustrating a state in which piezoelectric element 7 and first acoustic matching layer 2 are bonded to metal housing 6. First acoustic matching layer 2 includes skin 3 and core 4 as illustrated in FIG. 1, and here, a state is illustrated in which the flow direction of the resin generated in skin 3 and indicated by arrows 9 is aligned with the longitudinal direction of piezoelectric element 7.

As a material of first acoustic matching layer 2, a molding material that can create an orientation state caused by the resin flow at the time of molding is required. During this molding, the resin is injected from the thickness direction of first acoustic matching layer 2, and a molded body having a flow direction can be obtained. Examples of the material include resins such as a hard urethane resin, a polyphenylene sulfide (PPS) resin, a polyoxymethylene (POM) resin, an acrylonitrile butadiene styrene (ABS) resin, a liquid crystal polymer, and a polystyrene (PS) resin. In addition, for density adjustment, glass cloth or hollow filler can be mixed to enable density adjustment of the material. In the case of using the glass cloth or the hollow filler, because bonding properties with an adhesive is enhanced, strong bonding is obtained. Examples of the hollow filler include hollow balloons made of glass, ceramics, and resin.

In addition, examples of a material suitable for second acoustic matching layer 5 include, in consideration of the acoustic impedance matching between the gas and the piezoelectric element, a hard resin foam that is formed of a foamed resin having a closed pore structure and has a configuration including a plurality of holes and walls adjacent thereto. Examples of the hard resin foam include a hard acrylic foam, a hard vinyl chloride foam, a hard polypropylene foam, a hard polymethacrylimide foam, and a hard urethane foam.

FOAMAC (registered trademark) available from Sekisui Kasei Co., Ltd. is sold as an example of the hard acrylic foam, NAVICEL (registered trademark) available from JFC Inc. is sold as an example of the hard vinyl chloride foam, Zetron (registered trademark) available from Sekisui Chemical Co., Ltd. is sold as an example of the hard polypropylene foam, and ROHACELL (registered trademark) available from Daicel-Evonik Ltd. is sold as an example of the hard polymethacrylimide foam.

The ultrasonic sensor of the present exemplary embodiment can be manufactured, for example, by the following procedure.

First, metal housing 6, piezoelectric element 7, first acoustic matching layer 2, and second acoustic matching layer 5 are prepared. First acoustic matching layer 2 and second acoustic matching layer 5 are processed in advance to have desired thicknesses. Piezoelectric element 7 is pasted on the inner surface of the top plate of metal housing 6 with an adhesive or the like. In addition, first acoustic matching layer 2 is pasted on the outer surface of the top plate, and second acoustic matching layer 5 is further pasted on first acoustic matching layer 2. Thereafter, wiring lines 8a and 8b are connected to piezoelectric element 7 and metal housing 6 to complete the ultrasonic sensor.

EXAMPLES

Hereinafter, the results of preparing the ultrasonic sensor according to the exemplary embodiment and examining the characteristics are described.

1. Preparation of Sample

First Example

In the present exemplary embodiment, ultrasonic sensor 1 was prepared as follows.

As piezoelectric element 7, lead zirconate titanate having a rectangular parallelepiped shape with a thickness of 2.65 mm, a longitudinal length of 7.4 mm, and a transverse length of 3.55 mm was used. Piezoelectric element 7 has a groove in the longitudinal direction. As an adhesive, an epoxy adhesive that is liquid at room temperature and solidifies by heating was used. Metal housing 6 made of steel use stainless (SUS) 304 having a thickness of 0.2 mm was used. A polymethacrylimide foamed resin was used as second acoustic matching layer 5. As this layer, one that has a density of 0.07 g/cm$^3$ and is processed into a disk shape having a dimension of 10 mm in diameter and 0.75 mm in thickness was used.

As first acoustic matching layer 2, a liquid crystal polymer obtained by mixing a hollow filler made of glass as a raw material in a low-density portion and a glass fiber in a high-density portion was used. In the molding process using this material, a resin was injected from the thickness direction of first acoustic matching layer 2 to mold first acoustic matching layer 2 into a disk shape having a thickness of 1.0 mm and a diameter of 10 mm. A density of this material was 1.0 g/cm$^3$. A resin layer filled with the hollow filler was exposed on the surface, the resin layer having a pore structure derived from the hollow filler and with a diameter of 50 μm. The bonding to metal housing 6 was performed after the longitudinal direction of piezoelectric element 7 was made parallel with the resin injection direction of first acoustic matching layer 2.

Second Example

In the present exemplary embodiment, ultrasonic sensor 1 was prepared as follows.

As piezoelectric element 7, lead zirconate titanate having a rectangular parallelepiped shape with a thickness of 2.65 mm, a longitudinal length of 7.4 mm, and a transverse length of 3.55 mm was used. Piezoelectric element 7 has a groove in the longitudinal direction. As an adhesive, an epoxy adhesive that is liquid at room temperature and solidifies by heating was used. Metal housing 6 made of steel use stainless (SUS) 304 having a thickness of 0.2 mm was used. A polymethacrylimide foamed resin was used as second acoustic matching layer 5. As this layer, one that has a density of 0.07 g/cm$^3$ and is processed into a disk shape having a dimension of 10 mm in diameter and 0.75 mm in thickness was used.

As first acoustic matching layer 2, a liquid crystal polymer obtained by mixing a hollow filler made of glass as a raw material in a low-density portion and a glass fiber in a high-density portion was used. In the molding process using this material, a resin was injected from the thickness direction of first acoustic matching layer 2 to mold first acoustic matching layer 2 into a disk shape having a thickness of 1.0 mm and a diameter of 10 mm. A density of this material was 1.2 g/cm$^3$. A resin layer filled with the hollow filler was exposed on the surface, the resin layer having a pore structure derived from the hollow filler and with a diameter of 50 μm. The bonding to metal housing 6 was performed after the longitudinal direction of piezoelectric element 7 was made parallel with the resin injection direction of first acoustic matching layer 2.

Third Example

In the present exemplary embodiment, ultrasonic sensor 1 was prepared as follows.

As piezoelectric element 7, lead zirconate titanate having a rectangular parallelepiped shape with a thickness of 2.65 mm, a longitudinal length of 7.4 mm, and a transverse length of 3.55 mm was used. Piezoelectric element 7 has a groove in the longitudinal direction. As an adhesive, an epoxy adhesive that is liquid at room temperature and solidifies by heating was used. Metal housing 6 made of steel use stainless (SUS) 304 having a thickness of 0.2 mm was used. A polymethacrylimide foamed resin was used as second acoustic matching layer 5. As this layer, one that has a density of 0.07 g/cm$^3$ and is processed into a disk shape having a dimension of 10 mm in diameter and 0.75 mm in thickness was used.

As first acoustic matching layer 2, a liquid crystal polymer obtained by mixing a hollow filler made of glass as a raw material in a low-density portion and a glass fiber in a high-density portion was used. In the molding process using this material, a resin was injected from the thickness direction of first acoustic matching layer 2 to mold first acoustic matching layer 2 into a disk shape having a thickness of 1.0 mm and a diameter of 10 mm. A density of this material was 1.5 g/cm$^3$. A resin layer filled with the hollow filler was exposed on the surface, the resin layer having a pore structure derived from the hollow filler and with a diameter of 50 μm. The bonding to metal housing 6 was performed after the longitudinal direction of piezoelectric element 7 was made parallel with the resin injection direction of first acoustic matching layer 2.

First Comparative Example

In the present exemplary embodiment, ultrasonic sensor 1 was prepared as follows.

As piezoelectric element 7, lead zirconate titanate having a rectangular parallelepiped shape with a thickness of 2.65 mm, a longitudinal length of 7.4 mm, and a transverse length of 3.55 mm was used. Piezoelectric element 7 has a groove in the longitudinal direction. As an adhesive, an epoxy adhesive that is liquid at room temperature and solidifies by heating was used. Metal housing 6 made of steel use stainless (SUS) 304 having a thickness of 0.2 mm was used. A polymethacrylimide foamed resin was used as second acoustic matching layer 5. As this layer, one that has a density of 0.07 g/cm$^3$ and is processed into a disk shape having a dimension of 10 mm in diameter and 0.75 mm in thickness was used.

As first acoustic matching layer 2, a liquid crystal polymer obtained by mixing a hollow filler made of glass as a raw material in a low-density portion and a glass fiber in a high-density portion was used. In the molding process using this material, a resin was injected from the thickness direction of first acoustic matching layer 2 to mold first acoustic matching layer 2 into a disk shape having a thickness of 1.0 mm and a diameter of 10 mm. A density of this material was 1.0 g/cm$^3$. A resin layer filled with the hollow filler was exposed on the surface, the resin layer having a pore structure derived from the hollow filler and with a diameter of 50 μm. The bonding to metal housing 6 was performed after the resin injection direction of first acoustic matching layer 2 was rotated by 90° with respect to the longitudinal direction of piezoelectric element 7.

Second Comparative Example

In the present exemplary embodiment, ultrasonic sensor 1 was prepared as follows.

As piezoelectric element 7, lead zirconate titanate having a rectangular parallelepiped shape with a thickness of 2.65 mm, a longitudinal length of 7.4 mm, and a transverse length of 3.55 mm was used. Piezoelectric element 7 has a groove in the longitudinal direction. As an adhesive, an epoxy adhesive that is liquid at room temperature and solidifies by heating was used. Metal housing 6 made of steel use stainless (SUS) 304 having a thickness of 0.2 mm was used. A polymethacrylimide foamed resin was used as second acoustic matching layer 5. As this layer, one that has a density of 0.07 g/cm$^3$ and is processed into a disk shape having a dimension of 10 mm in diameter and 0.75 mm in thickness was used.

As first acoustic matching layer 2, a liquid crystal polymer obtained by mixing a hollow filler made of glass as a raw material in a low-density portion and a glass fiber in a high-density portion was used. In the molding process using this material, a resin was injected from the thickness direction of first acoustic matching layer 2 to mold first acoustic matching layer 2 into a disk shape having a thickness of 1.0 mm and a diameter of 10 mm. A density of this material was 1.2 g/cm$^3$. A resin layer filled with the hollow filler was exposed on the surface, the resin layer having a pore structure derived from the hollow filler and with a diameter of 50 μm. The bonding to metal housing 6 was performed after the resin injection direction of first acoustic matching layer 2 was rotated by 90° with respect to the longitudinal direction of piezoelectric element 7.

Third Comparative Example

In the present exemplary embodiment, ultrasonic sensor 1 was prepared as follows.

As piezoelectric element 7, lead zirconate titanate having a rectangular parallelepiped shape with a thickness of 2.65 mm, a longitudinal length of 7.4 mm, and a transverse length of 3.55 mm was used. Piezoelectric element 7 has a groove in the longitudinal direction. As an adhesive, an epoxy adhesive that is liquid at room temperature and solidifies by heating was used. Metal housing 6 made of steel use stainless (SUS) 304 having a thickness of 0.2 mm was used. A polymethacrylimide foamed resin was used as second acoustic matching layer 5. As this layer, one that has a density of 0.07 g/cm$^3$ and is processed into a disk shape having a dimension of 10 mm in diameter and 0.75 mm in thickness was used.

As first acoustic matching layer 2, a liquid crystal polymer obtained by mixing a hollow filler made of glass as a raw material in a low-density portion and a glass fiber in a high-density portion was used. In the molding process using this material, a resin was injected from the thickness direction of first acoustic matching layer 2 to mold first acoustic matching layer 2 into a disk shape having a thickness of 1.0 mm and a diameter of 10 mm. A density of this material was 1.5 g/cm$^3$. A resin layer filled with the hollow filler was exposed on the surface, the resin layer having a pore structure derived from the hollow filler and with a diameter of 50 μm. The bonding to metal housing 6 was performed after the resin injection direction of first acoustic matching layer 2 was rotated by 90° with respect to the longitudinal direction of piezoelectric element 7.

Fourth Comparative Example

In the first exemplary embodiment, ultrasonic sensor 1 was prepared as follows.

As piezoelectric element 7, lead zirconate titanate having a rectangular parallelepiped shape with a thickness of 2.65 mm, a longitudinal length of 7.4 mm, and a transverse length of 3.55 mm was used. Piezoelectric element 7 has a groove in the longitudinal direction. As an adhesive, an epoxy adhesive that is liquid at room temperature and solidifies by heating was used. Metal housing 6 made of steel use stainless (SUS) 304 having a thickness of 0.2 mm was used. A polymethacrylimide foamed resin was used as second acoustic matching layer 5. As this layer, one that has a density of 0.07 g/cm$^3$ and is processed into a disk shape having a dimension of 10 mm in diameter and 0.75 mm in thickness was used.

As first acoustic matching layer 2, a glass balloon-filled epoxy resin which is an epoxy resin filled with hollow filler made of glass as a raw material was used. The density of this material was 0.5 g/cm$^3$, and the material was processed into a disk shape having a thickness of 1.0 mm and a diameter of 10 mm and used. Note that the material has, on the surface, a pore structure derived from the hollow filler and with a diameter of 50 μm.

2. Evaluation of Characteristics

The characteristics of each of the prepared ultrasonic sensors 1 were measured. As a measurement method, the pair of prepared ultrasonic sensors 1 were opposed to each other, and ultrasonic waves were transmitted and received using one of the pair as a transmitter and the other as a receiver. Relative values with respect to the characteristics of the comparative example, which is set to 1, are shown. In addition, as a method of confirming the bonding reliability, the sensor was subjected to 200 cycles of a thermal shock test in which the environment of −40° C. for 30 minutes and the environment of 80° C. for 30 minutes were set as 1 cycle, the characteristics of the sensor after the test were compared with the initial characteristics of the sensor, and a rate of change thereof was confirmed.

Regarding the reliability, a sample in which a change in characteristics after the thermal shock test exceeds ±30% is described as "NO GOOD", a sample in which the change ranges from ±30% to 5% is described as "GOOD", and a sample in which the change is ±5% or less is described as "VERY GOOD". These results are collectively shown in Table 1.

TABLE 1

|  | Example 1 | Example 2 | Example 3 | Comparative example 1 | Comparative example 2 | Comparative example 3 | Comparative example 4 |
|---|---|---|---|---|---|---|---|
| First acoustic matching layer | Liquid crystal polymer | Liquid crystal polymer | Liquid crystal polymer | Liquid crystal polymer | Liquid crystal polymer | Liquid crystal polymer | Epoxy |
| Density (g/cm$^3$) | 1.0 | 1.2 | 1.5 | 1.0 | 1.2 | 1.5 | 0.5 |
| Flow direction and (longitudinal) direction of piezoelectric element | Parallel | Parallel | Parallel | 90° | 90° | 90° | No directivity |
| Second acoustic matching layer | Foamed resin | Foamed resin | Foamed resin | Foamed resin | Foamed resin | Foamedr esin | Foamed resin |
| Characteristics of ultrasonic sensor | 1.8 | 2.0 | 2.3 | 1.8 | 2.0 | 2.3 | 1 |
| Reliability | Very good | Very good | Very good | No good | No good | No good | Good |

3. Discussion of Results

As for the initial characteristics of ultrasonic sensor 1, it has been found that the sample in which the density of first acoustic matching layer 2 is in the range of 1.0 g/cm$^3$ to 1.5 g/cm$^3$ exhibits high characteristics. This is considered to be because, from the viewpoint of the impedance matching of piezoelectric element 7 and second acoustic matching layer 5 and the transmission efficiency of the ultrasonic waves in first acoustic matching layer 2, the sensor is in an appropriate range regarding hardness and impedance matching. In particular, in the case where the density of first acoustic matching layer 2 is 1.5 g/cm$^3$, high characteristics are exhibited.

It has been found that the change in characteristics of ultrasonic sensor 1 before and after the thermal shock test is affected by the bonding direction of first acoustic matching layer 2. In particular, it has been confirmed that the reliability characteristics are improved in the case where the flow direction at the time of molding is parallel with the longitudinal direction of piezoelectric element 7. Because the liquid crystal polymer has a low coefficient of thermal expansion in the flow direction and exhibits high thermal expansion in a direction 90° with respect to the flow direction, it is necessary not to transmit expansion and contraction generated in the course of temperature change to piezoelectric element 7.

In the present disclosure, by matching the flow direction at the time of molding with the longitudinal direction of the piezoelectric element and then performing the pasting to the metal housing, stress due to the expansion and contraction can be relaxed and the reliability has been secured. On the other hand, in the case where the piezoelectric element is pasted in the direction 90° with respect to the flow direction, it is considered that the stress due to the expansion and contraction is transmitted to the piezoelectric element and the reliability has become low.

As described above, an ultrasonic sensor according to the first disclosure includes: a piezoelectric element; and a plurality of acoustic matching layers including a first acoustic matching layer laminated and bonded to the piezoelectric element, in which the first acoustic matching layer includes a thermoplastic resin, and the thermoplastic resin is injected to the first acoustic matching layer from a thickness direction of the first acoustic matching layer.

In the ultrasonic sensor according to the second disclosure, in particular, according to the first disclosure, the piezoelectric element may be a rectangular parallelepiped having a rectangular bonding surface, the first acoustic matching layer may have a flow direction caused by injection of the thermoplastic resin, and the flow direction may be matched in parallel with a longitudinal direction of the piezoelectric element before laminating and bonding are performed.

In the ultrasonic sensor according to the third disclosure, according to the first disclosure, the first acoustic matching layer may have an average density of 1.0 g/cm$^3$ or more and 1.5 g/cm$^3$ or less. By setting the average density of the first acoustic matching layer within this range, the ultrasonic waves can be transmitted with high efficiency from the piezoelectric element to the acoustic matching layer bonded to the first acoustic matching layer, so that the characteristics of the ultrasonic sensor are improved.

In the ultrasonic sensor according to the fourth disclosure, according to the second disclosure, the first acoustic matching layer may have an average density of 1.0 g/cm$^3$ or more and 1.5 g/cm$^3$ or less. By setting the average density of the first acoustic matching layer within this range, the ultrasonic waves can be transmitted with high efficiency from the piezoelectric element to the acoustic matching layer bonded to the first acoustic matching layer, so that the characteristics of the ultrasonic sensor are improved.

In the ultrasonic sensor according to the fifth disclosure, according to any one of the first to fourth disclosures, the first acoustic matching layer may include, as a constituent component, a material filled with hollow spheres made of glass, ceramic, or resin. Because the hollow spheres have a very low density and become voids when appearing on the surface by polishing, cutting, or the like, an anchor effect can be easily obtained at the time of bonding.

In the ultrasonic sensor according to the sixth disclosure, according to any one of the first to fourth disclosures, the first acoustic matching layer may have a thickness set to approximately ¼ of the speed of sound.

In the ultrasonic sensor according to the seventh disclosure, according to the fifth disclosure, the first acoustic matching layer may have a thickness set to approximately ¼ of the speed of sound.

INDUSTRIAL APPLICABILITY

As described above, the ultrasonic sensor of the present disclosure is suitable for use in flow rate meters for measuring various fluids. In particular, the sensor is suitably used for applications requiring excellent durability in use environments such as high temperature and low temperature.

REFERENCE MARKS IN THE DRAWINGS 1 ultrasonic sensor
2 first acoustic matching layer
3 skin
4 core
5 second acoustic matching layer
6 metal housing
7 piezoelectric element

The invention claimed is:

1. An ultrasonic sensor comprising:
a piezoelectric element; and
a plurality of acoustic matching layers including a first acoustic matching layer laminated and bonded to the piezoelectric element,
wherein the first acoustic matching layer includes a thermoplastic resin, and
the thermoplastic resin is injected to the first acoustic matching layer from a thickness direction of the first acoustic matching layer,
the piezoelectric element is a rectangular parallelepiped having a rectangular bonding surface,
the first acoustic matching layer has a flow direction caused by injection of the thermoplastic resin, and
the piezoelectric element and the first acoustic matching layer are laminated and bonded together with the flow direction being matched in parallel with a longitudinal direction of the piezoelectric element.

2. The ultrasonic sensor according to claim 1, wherein the first acoustic matching layer has an average density of 1.0 g/cm$^3$ or more and 1.5 g/cm$^3$ or less.

3. The ultrasonic sensor according to claim 1, wherein the first acoustic matching layer includes, as a constituent component, a material filled with hollow spheres made of glass, ceramic, or resin.

4. The ultrasonic sensor according to claim 1, wherein the first acoustic matching layer has a thickness set to approximately ¼ of a speed of sound.

5. The ultrasonic sensor according to claim 3, wherein the first acoustic matching layer has a thickness set to approximately ¼ of a speed of sound.

* * * * *